June 21, 1932. W. B. WELLS 1,864,224
LIGHT SIGNAL
Filed Jan. 8, 1931 3 Sheets-Sheet 2

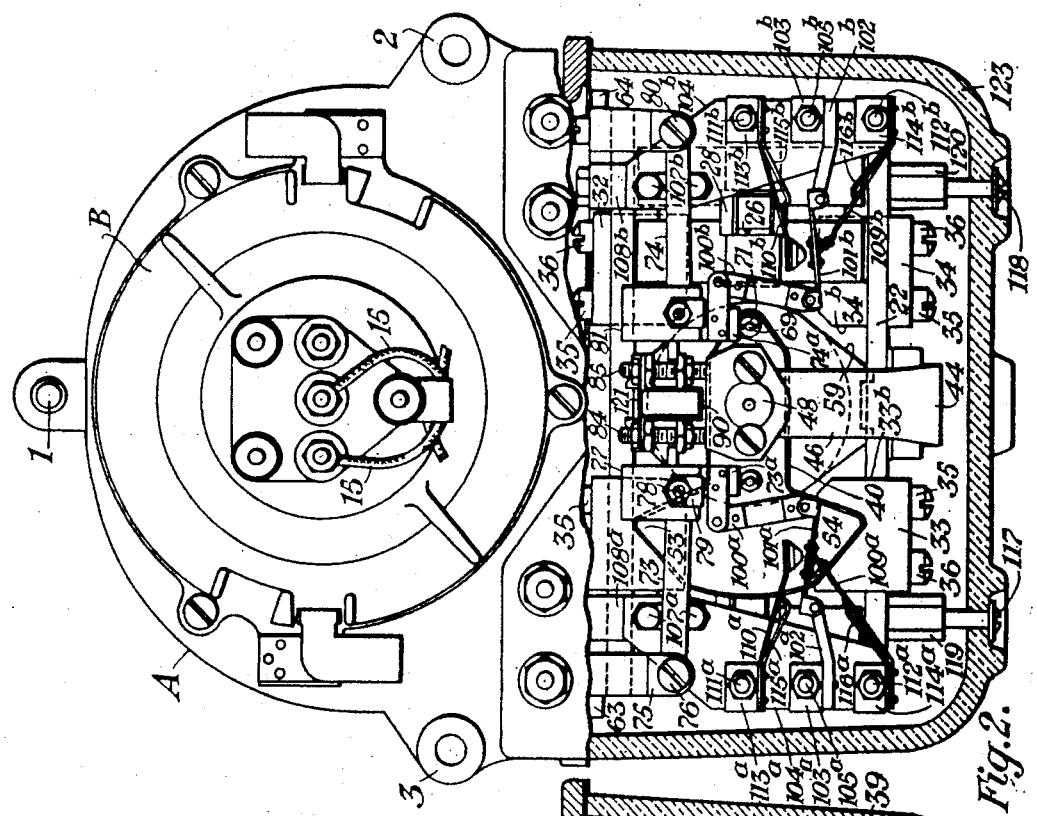
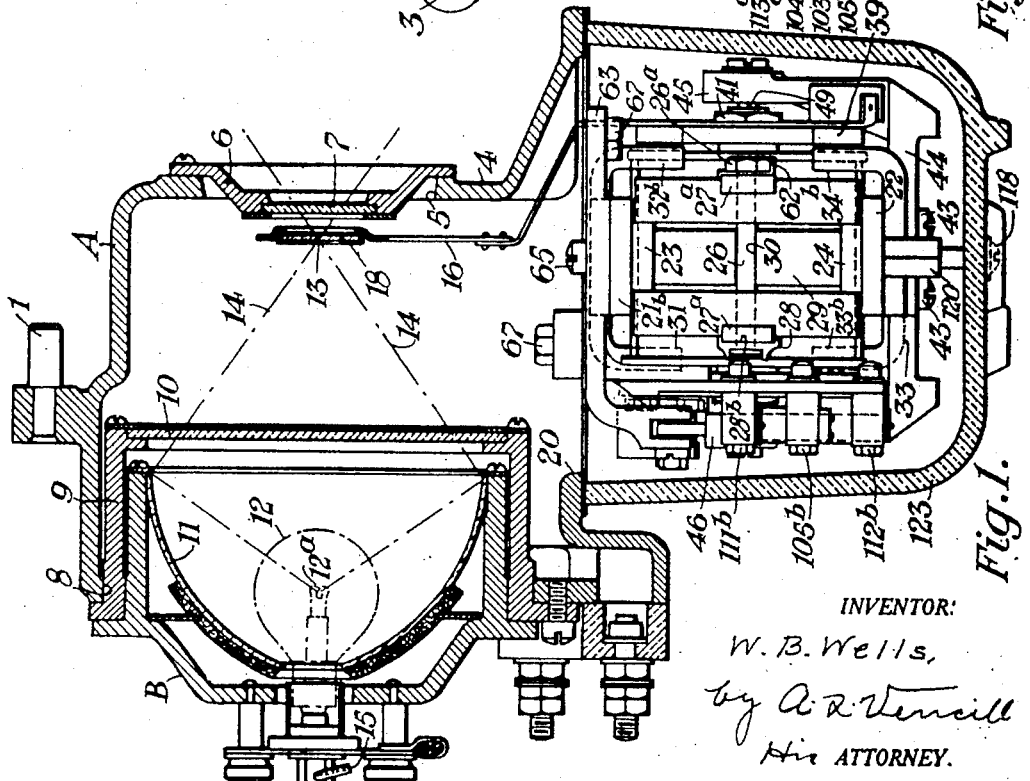
Fig.2.
Fig.1.
INVENTOR:
W. B. Wells,
by A. R. Vencill
His ATTORNEY.

INVENTOR.
W. B. Wells,
by A. L. Vencill
His ATTORNEY.

June 21, 1932.  W. B. WELLS  1,864,224
LIGHT SIGNAL
Filed Jan. 8, 1931   3 Sheets-Sheet 3

INVENTOR:
W. B. Wells,
by A. F. Vincill
His ATTORNEY.

Patented June 21, 1932

1,864,224

UNITED STATES PATENT OFFICE

WESLEY B. WELLS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed January 8, 1931. Serial No. 507,383.

My invention relates to light signals, and particularly to light signals which are capable of selectively projecting a plurality of beams of light of different colors from a single light source.

I will describe one form of light signal embodying my invention, and will then point out the novel features thereof in claims.

Figure 10:
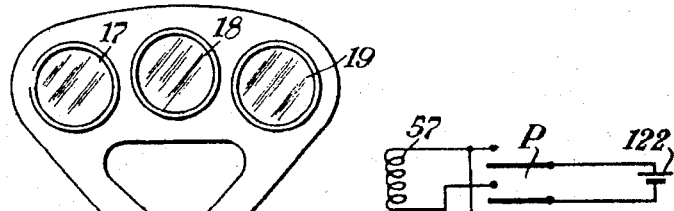
Figure 3:
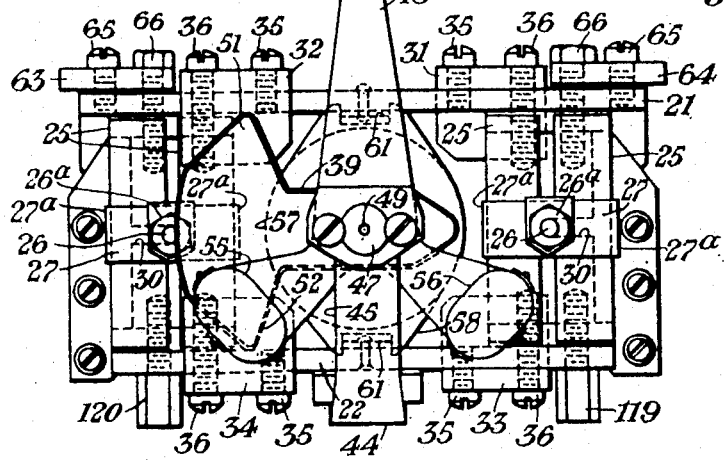
Figures 6, 7:
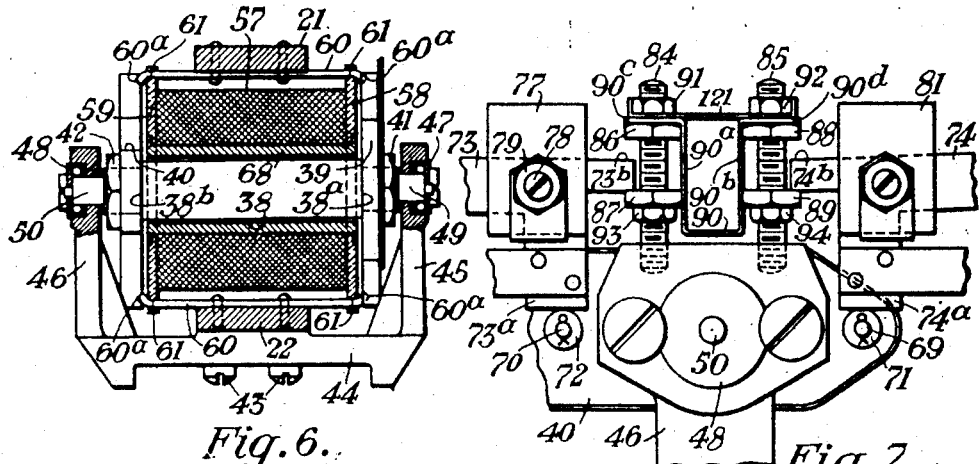
Figures 8, 9:
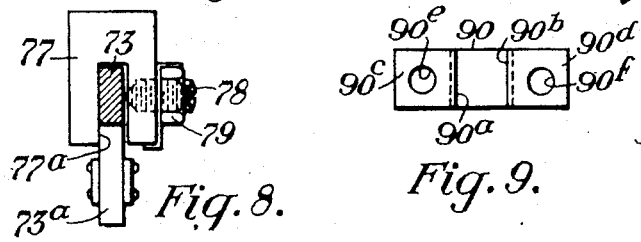
Figure 4:
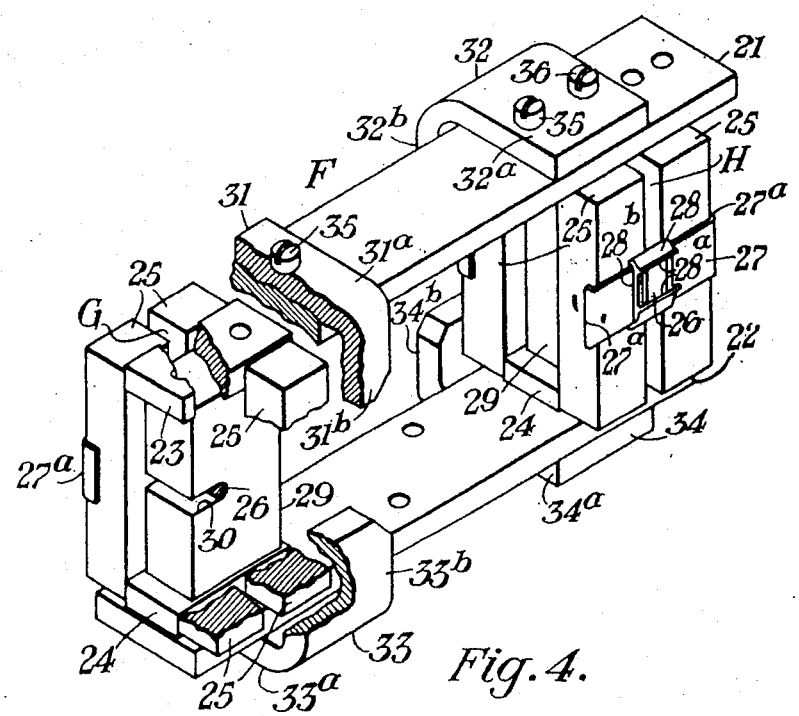
Figure 5:
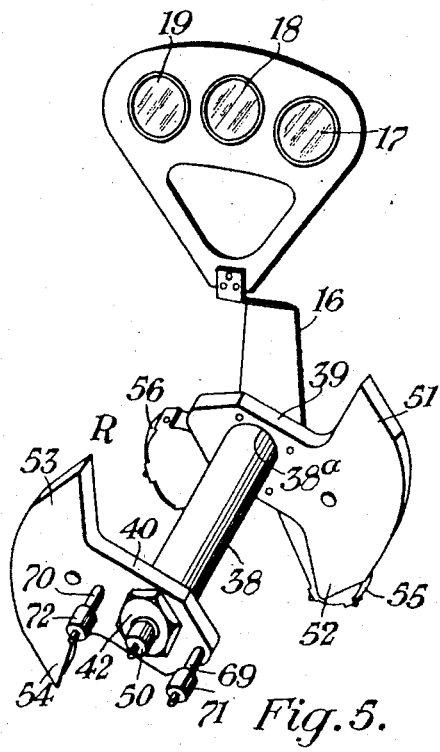

In the accompanying drawings, Fig. 1 is a vertical sectional view showing one form of light signal embodying my invention. Fig. 2 is a view partly cross sectional, of the signal shown in Fig. 1 as it appears when viewed from the left with certain of the parts broken away to more clearly illustrate the construction of the operating mechanism. Fig. 3 is a view of the operating mechanism for the signal shown in Figs. 1 and 2 as it appears when viewed from the right in Fig. 1. Fig. 4 is an isometric view of the field structure forming part of the operating mechanism for the signal shown in Figs. 1, 2 and 3, certain of the parts being broken away to better illustrate the construction. Fig. 5 is an isometric view of the rotor forming part of the operating mechanism for the signal illustrated in Figs. 1 and 2. Fig. 6 is a detail view, partly in section, and partly in elevation, showing a portion of the operating mechanism for the signals illustrated in Figs. 1 and 2. Fig. 7 is a detail view, showing on an enlarged scale, a portion of the operating mechanism for the signals illustrated in Figs. 1 and 2. Fig. 8 is a detail view of the counterweight arm 73 and the associated weight 77 forming part of the operating mechanism for the signal illustrated in Figs. 1 and 2. Fig. 9 is a top plan view of the locking member 90 forming part of the operating mechanism for the signal illustrated in Figs. 1 and 2. Fig. 10 is a diagrammatic view showing a circuit for controlling the relay.

Similar reference characters refer to similar parts in each of the several views.

Referring first to Figs. 1 and 2, the signal comprises a suitable casing A which, in the form here shown, is semi-cylindrical in shape. The top of the casing A is provided with a forwardly projecting stud 1, and the side walls of the casing are provided with apertured lugs 2 and 3, as shown in Fig. 2, by means of which stud and lugs, the signal may be attached to a suitable support.

Located in the forward wall 4 of the casing A is an aperture 5, and secured to the casing adjacent this aperture is a ring member 6 provided with a transparent roundel or cover glass 7 through which the signal beam is projected. The rear wall of the casing is also provided with an aperture 8, and extending into the casing through this latter aperture is a tubular member 9 which is closed at its inner end by a transparent cover glass 10, one function of which is to prevent moisture and dirt from entering the casing A. Fitting within the tubular member 9 is a removable light unit B. This light unit may be of any suitable type, and as here shown, comprises an elliptical reflector 11, and an electric lamp 12 having its filament $12^a$ so positioned with relation to the reflector, that the reflector will collect a large percentage of the light rays emitted by the lamp and cause them to converge at or near a focal point 13, as indicated by the dash lines 14. The lamp 12 may be supplied with current from any suitable source not shown in the drawings through conductors 15.

Extending upwardly into the casing A through a suitable opening 20 formed in the bottom of the casing, as best seen in Fig. 1, is a spectacle arm 16 which is provided at its upper end with three differently colored filters 17, 18 and 19, as best seen in Figs. 3 and 5. This arm is controlled by suitable operating mechanism embodying my invention, which operating mechanism I will describe in detail hereinafter, and is capable of assuming three positions: namely, a central or vertical position in which the filter 18 is located in axial alignment with the cover glass 7 at or near the focal point 13, a right-hand position (as viewed in Fig. 5) in which the filter 19 is located in axial alignment with the cover glass 7 at or near the focal point 13, and a left-hand position in which the filter 17 is located in axial alignment with the cover glass 7 at or near the focal point 13. It will be apparent, that when one of the filters is located in axial alignment with the cover glass 7 at the focal point 13, the light rays passing through the focal point will pass through the filter, so that only light rays of the color which are not filtered out can emerge from the signal. Since the filters are differently colored, it follows that the signal is capable of displaying three different aspects depending upon which of the filters is located at the focal point 13. In the practical application of my signal to railway signaling, the spectacle arm 16 is biased to the vertical position, and the filter 18 is colored red so that when the arm occupies this position, the projected beam is red indicating "stop". The filter 17 is colored green and the filter 19 is colored yellow so that when the arm 16 occupies its left-hand position, the beam emitted by the signal is green, indicating "proceed", and when the arm 16 occupies its right-hand position the beam emitted by the signal is yellow, indicating "caution".

The operating mechanism for the spectacle arm 16 is of the three position motor relay type, and comprises a field structure F which is best illustrated in Fig. 4, and a rotor R which is best illustrated in Fig. 5. Referring to Fig. 4, the field structure comprises two spaced magnets G and H, the like poles of which are connected by magnetizable spaced parallel backstraps 21 and 22 respectively. The magnets G and H may be of any suitable type, such for example, as the well known electromagnet employing a magnetizable core carrying an energizing winding, but in order to decrease the cost of manufacture and improve the efficiency of operation of the signal, I prefer to employ the construction illustrated in the drawings. As here shown, each magnet comprises two rectangular plates 23 and 24 of suitable magnetizable material, which plates are clamped between two pairs of vertically extending permanently magnetized rectangular bars 25 adjacent the upper and lower ends of the bars, respectively. The bars 25 of each pair are disposed in parallel spaced relation with one another, and are so arranged that their corresponding ends are all of the same polarity. These bars are removably maintained in position by means of a clamping bolt 26 which extends horizontally through retaining clips 27, and between the bars 25 of each pair at a point approximately midway between their ends. The clips 27 are provided with ears 27ª at each end, which ears overlap the opposite sides of the two bars of each pair for holding the bars in the proper spaced relation. To prevent the bolt 26 from turning while the associated nut 26ª is being tightened or loosened, an auxiliary clip 28 is interposed between the head of the bolt and the associated clip 27. This auxiliary clip extends transversely of the associated clip 27, and is provided in its inner side with a horizontal channel 28ᵇ which receives the associated clip 27, and on its outer side with spaced parallel ribs 28ª which engage the opposite sides of the rectangular head of the bolt 26. A flat locking plate 62 (see Fig. 1) is also interposed between each nut 26ª and the associated clip 27. This locking plate is made of deformable material, and after the nut has been tightened, one end of this plate is bent into engagement with the edge of the associated clip, and the other end is bent into engagement with the nut, thus preventing the nut from becoming loosened. A spacing block 29 of brass or other suitable non-magnetic material is interposed between the plates 23 and 24 of each magnet, and the spacing block, plates, and backstraps are all securely fastened together by means which will be described hereinafter. Each block 29 is provided with a horizontal slot 30 through which the clamping bolt 26 passes with some clearance, and which is open at its outer end to permit the bolt to be inserted or removed from the slot by sliding it outwardly at right angles to the axis of the block 29. It will be noted that the width of the spacing block is less than the width of the plates 23 and 24, thus providing clearance between the block and the bars. Clearance is also provided between the ends of the bars and the backstraps 21 and 22. By means of this construction, the four bars of either magnet may be removed from the field structure for inspection or replacement merely by loosening the associated nut 26ª and sliding the bolt, clips, and bars outwardly in the direction of the axes of the backstraps (see Fig. 1). Furthermore, with this construction, the remainder of the operating mechanism for the signal may be assembled before the bars are added to the field structure. This is a distinct advantage, because, if the magnetized bars were assembled to the field structures before the remainder of the operating mechanism of the signal was assembled, then while the remainder of the operating mechanism was being assembled, iron and steel filings might be attracted to the bars, which is undesirable. By assembling the mechanism completely without the bars, the operating mechanism can be cleaned either with a vacuum or a blast of air, and the bars can be freed of all filings and assembled as a last operation.

It should be pointed out that the magnetic contact between the bars and the backstraps 21 and 22 is made through the medium of the plates 23 and 24, and not at the ends of the bars, so that no machining of the bars is necessary other than cutting them to the desired length which need not be done with great accuracy. It will be seen therefore, that the magnets when constructed in accordance with my invention are very economical to manufacture. It should also be pointed out that while I have shown each magnet as comprising four permanently magnetized bars, this number of bars is not essential to my invention, but may be varied in accordance with the field strength which it is desired to attain.

Associated with the backstrap 21 are two pole pieces 31 and 32, and associated with the backstrap 22 are two pole pieces 33 and 34. As here shown, these pole pieces are L-shaped, being formed with horizontally extending legs 31ª, 32ª, 33ª, and 34ª, respectively, and with vertically extending legs 31ᵇ, 32ᵇ, 33ᵇ, and 34ᵇ, respectively. The horizontal leg of each pole piece is fastened to the associated backstrap by means of two screws 35 and 36, (see Figs. 3 and 4). Each screw 35 extends with clearance through a suitable hole in the pole piece and is screwed into a threaded hole in the associated backstrap. Each screw 36 extends through a suitable clearance hole in the pole piece, into and through a threaded hole in the associated backstrap, and through a clearance hole in the adjacent plate 23 or 24. It then passes into a clearance hole in the adjacent block 29. It thus prevents plates 23 or 24 and block 29 from turning about the associated tap bolt 66 (Fig. 3) described hereinafter. It will be apparent, therefore, that the screws 36 serve both as a means for fastening the pole pieces to the backstraps, and as part of the means referred to hereinbefore for fastening the backstraps 21 and 22, plates 23 and 24, and spacing blocks 29 together. The pole pieces 31 and 32 are spaced apart, and are disposed with their vertical legs extending downwardly on opposite sides of the backstrap 21. The pole pieces 33 and 34 are similarly spaced apart, and are disposed with their vertical legs extending upwardly directly below the downwardly extending legs of the pole pieces 31 and 32, respectively. It will be apparent, therefore, that the field structure embraces two pairs of pole pieces, the one pair of which 31 and 33 is located on one side of, and adjacent one end of the backstraps 21 and 22; and the other pair of which 33 and 34 is located on the other side of, and adjacent the opposite end of, the backstraps 21 and 22. It will also be apparent that the pole pieces 31 and 32 will be of one polarity while the pole pieces 33 and 34 will be of the opposite polarity. For example, if the bars 25 are disposed with their north magnetic poles located at the upper ends of the bars, the pole pieces 31 and 32 will be north poles, while the pole pieces 33 and 34 will be south poles. The ends of the pole pieces of each pair are separated from each other by a horizontal air gap, and the outer faces of each pair are disposed in the same vertical plane. The inner corners of the pole pieces are cut away to provide clearance for the rotor coil 57 (Fig. 3) which will be described hereinafter.

The field structure F is suspended from the casing A by means of two brackets 63 and 64 (see Figs. 1 and 3). These brackets are of suitable non-magnetizable material such as brass, and are each fastened to the upper backstrap 21 by means of a machine screw 65 which passes through a suitable hole in the bracket and is screwed into a tapped hole in the backstrap. The brackets 63 and 64 are also each fastened to the backstrap 21 by means of a tap bolt 66 which passes through suitable clearance holes in the associated bracket 63 or 64, the backstrap 21, and the adjacent plate 23, and is screwed into the adjacent spacing block 29. It will be noted that the tap bolts 66 serve as part of the means referred to previously for clamping the backstrap 21, plates 23, and spacing blocks 29 together. The brackets 63 and 64 may be fastened to the casing A in any suitable manner as by tap bolts 67 (Fig. 1).

Attached to the lower backstrap 22 between the pole pieces 33 and 34 by means of screws 43 is a non-magnetizable bracket 44. This bracket is substantially U-shaped, and the upwardly extending arms 45 and 46 thereof are provided in their upper ends with aligned ball bearings 47 and 48, respectively, in which the rotor R referred to hereinbefore is journalled, as best seen in Figs. 1 and 6.

Referring now also to Figs. 5 and 6, the rotor R, in the form here shown, comprises a core 38 of suitable magnetizable material, such as silicon steel, provided adjacent its ends with shoulders 38ª and 38ᵇ against which oppositely extending armatures 39 and 40 are clamped by means of nuts 41 and 42, respectively. Shafts 49 and 50 of suitable non-magnetizable material, such as phosphor bronze, are inserted in the ends of the core 38, and these shafts are mounted to rotate in the ball bearings 47 and 48 previously described. The armature 39 is adapted to cooperate with the pole pieces 32 and 34, and is spaced from the outer or pole faces of the vertical legs 32ᵇ and 34ᵇ of these pole pieces by vertical air gaps, as will be seen from an inspection of Fig. 1. The armature 40 is likewise adapted to cooperate with the pole pieces 31 and 33, and is spaced from the outer or pole faces of the vertical legs 31ᵇ and 33ᵇ of these pole pieces by vertical air gaps. The armatures 39 and 40 are of magnetizable material, and are provided with ears 51, 52, 53 and 54 which taper from the center of the armature as shown, the reasons for tapering these ears being explained hereinafter.

Attached to the outer side of the armature 40 on opposite sides of the axis of the core 38 of the rotor R, as best seen in Figs. 2, 5 and 7, are two studs 69 and 70, and mounted on these studs are two rollers 71 and 72, respectively. The roller 72 cooperates with a counter-weight arm 73 (see Fig. 7) at the lower end of a downwardly projecting portion 73ª formed integral with the arm adjacent the inner end of the arm, and the roller 71 cooperates with a similar counter-weight arm 74 at the lower end of a downwardly projecting portion 74. The counter-weight arm 73 is pivotally supported at its outer end on a pivot pin 76 (Fig. 2), and carries a weight 77. The weight 77 is slotted in its underside at 77ª (see Fig. 8) to receive the arm, and is adapted to be fastened in an adjusted longitudinal position on the arm by means of a pointed set screw 78 which is screwed through the weight at one side of the slot for engagement with the arm. The set screw 78 carries a lock nut 79 by means of which the set screw is prevented from becoming loosened. The pivot pin 76 on which the arm 73 is pivoted is carried by a bifurcated lug 75 which extends downwardly from the bracket 63 which supports the one end of the field structure F. The counter-weight arm 74 is pivotally supported at its outer end on a pivot pin 80, and carries a weight 81 which is similar to the weight 77, and which is adapted to be fastened in an adjusted longitudinal position on the arm 74 in the same manner as the weight 77 is fastened in an adjusted position on the arm 73. The counter-weight arms normally rest on the associated rollers 71 and 72, and it will be obvious that if the rotor R is rotated from its normal position in a clockwise direction as viewed in Figs. 2 and 7, the arm 73 will be raised but that, if the rotor is rotated from its normal position in the opposite or counter-clockwise direction, the other arm will be raised, thus providing means whereby the rotor is biased to a middle or normal position in which the longer axes of the armatures 39 and 40 are substantially horizontal Located adjacent the inner or confronting ends of the counter-weight arms 73 and 74 are two threaded studs 84 and 85 which are screwed into the upper end of the arm 46 of the bracket 44 which supports the rotor R. The stud 84 is provided with two stop nuts 86 and 87 which cooperate with a projecting portion 73ᵇ formed on the end of the counter-weight arm 73 to limit the stroke of this counter-weight arm. The stud 85 is likewise provided with two stop nuts 88 and 89 which cooperate with a projecting portion 74ᵇ formed on the end of the arm 74 to limit the stroke of this arm. It will be seen from an inspection of Fig. 7 that when the counter-weight arm 73 has been raised to the position in which the projection 73ᵇ engages the nut 86, it acts as a stop to prevent further rotation of the rotor R in a clockwise direction, and that when the counter-weight arm 74 has been raised to the position in which the projection 74ᵇ engages the nut 88, it acts as a stop to prevent further rotation of the rotor R in a counter-clockwise direction. It follows that by varying the vertical position of the nuts 86 and 88 on the studs 84 and 85, the distance through which the rotor R can swing from its normal position in either direction, can be conveniently and accurately adjusted to any desired value. The lower stop nuts 87 and 89 limit the downward movement of the counter-weight arms, and are so adjusted that when the rotor R has been rotated to its proper normal position by the counter-weight arms, the nuts 87 and 88 will just engage the projecting portions 73ᵇ and 74ᵇ, respectively, of these arms. With this adjustment the counter-weight arms will bring the rotor back to its central or normal position.

It is important that after the stop nuts have been adjusted to the proper positions, they remain in these positions. For the purpose of holding the stop nuts in their adjusted positions, I provide a locking member comprising a flat metal strip 90 bent into a substantially U-shape, and having spaced vertically extending parallel legs 90ª and 90ᵇ which are connected at their lower ends by an integral web and which are provided at their upper ends with oppositely disposed integral horizontal extensions 90ᶜ and 90ᵈ, respectively. The extensions 90ᶜ and 90ᵈ are formed with holes 90ᵉ and 90ᶠ, respectively (see Fig. 9), which are adapted to receive the studs 84 and 85, and the parts are so proportioned that when the locking member is placed between the stop nuts with the holes 90ᵉ and 90ᶠ receiving the studs 84 and 85, the vertical side 90ª will snugly engage the flat sides of the stop nuts 86 and 87, while the vertical side 90ᵇ will snugly engage the flat sides of the stop nuts 88 and 89. The locking member is held in place by jam nuts 91 and 92 which are screwed onto the studs above the horizontal extensions 90ᶜ and 90ᵈ. Interposed between the jam nuts and the horizontal extensions of the locking member 90 is a deformable locking plate 121 which is apertured to receive the studs 84 and 85. When the jam nuts are tightened, the projecting ends of the locking plate are turned up against the sides of the jam nuts to prevent them from becoming loosened. It will be apparent, therefore, that the locking member is held securely in place thus preventing any movement of the adjusting nuts. If desired, jam nuts 93 and 94 may also be provided below the adjusting nuts 87 and 89.

It should be pointed out that the pivot pins 76 and 80 about which the counter-weight arms 73 and 74 rotate are located at such a distance above the points at which the rollers 72 and 71 engage the counter-weight arms, and the parts are so proportioned, that when an arm is being lifted by a roller, the point of contact between the portion 73ª or 74ª of the arm and the associated roller will move outwardly along the portion, and around the roller in counter-clockwise direction for 72 and clockwise direction for 71, so that there is substantially no sliding motion between the roller and the arm.

The counter-weight arms 73 and 74, in addition to biasing the rotor to its normal position, are arranged to operate separate contact mechanisms. These contact mechanisms are similar, and their corresponding parts are designated by the same reference character with the distinguishing exponents $a$ and $b$, respectively, so that an understanding of both will be had by a description of only one. Referring particularly to the contact mechanism controlled by the counter-weight arm 73 for example, an insulating link 100$^a$ is pivotally connected at one end to this arm, and at its other end to one end of a movable contact member 101$^a$. The free end of the movable contact member 101$^a$, in turn, is pivotally connected to a conducting arm 102$^a$ which is riveted or otherwise secured to a conducting block 103$^a$. The conducting block 103$^a$ is fastened to a contact carrying plate 104$^a$ by means of a bolt 105$^a$, which bolt also serves as a terminal post for connecting a conductor with the conducting block and, hence, with the movable contact member 101$^a$. The contact carrying plate 104$^a$ is of suitable insulating material, such as fiber, or a phenol condensate product, and is fastened at its upper end, by means of screws 107$^a$ to a downwardly extending lug 108$^a$ formed on the bracket 63 adjacent the lug 75 which supports the counter-weight arm 73. Secured to the contact carrying plate 104$^a$ on opposite sides of the conducting block 103$^a$, by means of bolts 111$^a$ and 112$^a$, are two other conducting blocks 113$^a$ and 114$^a$, respectively. The conducting block 113$^a$ carries a flexible contact finger 110$^a$, and a stop 115$^a$ which limits the downward movement of the contact finger 110$^a$. The conducting block 114$^a$ similarly carries a flexible contact finger 109$^a$ and a stop 116$^a$ which limits the upward movement of this latter finger. When the counter-weight arm 73 occupies its lowermost position, in which it is illustrated in the drawings, the movable contact member 101$^a$ engages the lower contact finger 109$^a$ and closes a back contact 101$^a$—109$^a$. When the counter-weight arm 73 is moved to its upward position, however, the contact 101$^a$ then engages the contact finger 110$^a$ to close a front contact 101$^a$—110$^a$. It should be pointed out that since the contact carrying plates are fastened to the same bracket which supports the associated counter-weight arm, there can be no change of relation between these two parts which would effect the contact adjustment. This arrangement provides positive operation of the contacts.

The spectacle arm 16 previously described is rigidly attached adjacent its lower end to the armature 39 of the rotor R in such manner that when the rotor occupies its normal position, the filter 18 carried by the spectacle arm is in axial alignment with the cover glass 7 at the focal point 13. The parts are so adjusted and so proportioned that, if the armature is rotated in the clockwise direction from its normal position to the position in which the counter-weight arm 73 engages the upper stop nut 86, the filter 19 will then be in axial alignment with the cover glass 7 at the focal point 13, and that, if the armature is rotated in a counter-clockwise direction to the position in which the counter-weight arm 74 engages the upper stop nut 88, the filter 17 will then be located in axial alignment with the cover glass 7 at the focal point 13. The spectacle arm 16 is provided at its lower end with two counter-weights 55 and 56 which also bias the rotor to its normal position.

Surrounding the core 38 of rotor R is the rotor coil 57 referred to hereinbefore. This coil may be of any suitable type but for reasons which will become apparent as the description proceeds, I prefer to employ a slow-acting coil. As here shown, this coil comprises the usual helix of insulated wire wound around a heavy tube 68 of suitable conducting material, such as copper, between insulating end plates 58 and 59, as best seen in Fig. 6. The coil 57 is supported between the backstraps 21 and 22 by means of two brackets 60 which are fastened as by riveting to the backstraps. The brackets 60 extend longitudinally of the coil at the top and bottom of the coil, and fit into suitable slots 61 formed in the end plates 58 and 59. The ends of the brackets 60 are bent over to form lugs 60$^a$ which engage the end plates to hold the coil in the proper longitudinal position with respect to the core.

It is desirable that the clearance between the core 38 and the coil 57 should be as small as possible, but since the core 38 is mounted to rotate within the coil, it is essential that the core and coil do not touch each other. It will be apparent, therefore, that the core 38 should be accurately centered with respect to the coil 57. To facilitate this centering, I preferably construct the brackets 60 of suitable material such as brass, which may be bent sufficiently to permit the necessary vertical adjustment of the coil, and I so proportion the brackets that, after they have been bent, they will not permit motion of the coil due to vibration or jarring of the signal. Furthermore, I construct the holes in the bracket 44 through which the screws 43 which fasten this bracket to the backstrap 22, pass, with sufficient clearance so that this bracket and, hence, the core 38 of the rotor R carried thereby, may be moved at right angles to the axis of the coil in the horizontal plane. It follows that with adjustments between the core and coil in both planes, the core can be conveniently and accurately centered with respect to the coil.

The rotor coil 57 is intended to be reversibly supplied with current, and for this purpose, I have shown in Fig. 10 a battery 122 which is connected with this coil over a pole changer P. As here shown, the pole changer P is manually operated, but in actual practice this pole changer will normally be replaced by pole changing contacts on a relay, or by the contacts of other signals which are similar to the signal here shown.

The operating mechanism is enclosed in a glass case 123 which is held in place by means of screws 117 and 118 which extend through suitable holes in the case, and are screwed into tapped holes in studs 119 and 120, respectively. The studs 119 and 120 pass through suitable clearance holes in the lower backstrap 22 and the lower conducting plates 24, and are screwed into the spacing blocks 29, so that these studs also serve as part of the means referred to hereinbefore for fastening the field structure together.

Assuming for purposes of explanation that the magnets G and H are so disposed that the pole pieces 31 and 32 become north poles, and the pole pieces 33 and 34 become south poles, the operation of the relay as a whole is as follows: When pole changer P occupies its middle position in which no current is supplied to coil 57, as shown in the drawings, the only flux which threads the armatures 39 and 40 is the flux from the associated pole pieces 32, 34 and 31, 33, and the armatures are so shaped, and the parts are so proportioned that this flux will exert no appreciable torque on the rotor. The rotor is therefore held in its normal position by the counter-weights 55 and 56, and by the counter-weight arms 73 and 74. When the rotor occupies this position, the filter 18 is located in axial alignment with the cover glass 7 at the focal point 13 as pointed out hereinbefore, and the beam projected by the signal is therefore red. Furthermore, the front contacts 101ᵃ—110ᵃ and 101ᵇ—110ᵇ controlled by the counter-weight arms are open, while the back contacts 101ᵃ—109ᵃ and 101ᵇ—109ᵇ are closed.

If, now, pole changer P is thrown in such a direction that winding 57 is supplied with current of normal polarity, armature 40 becomes a north pole and armature 39 becomes a south pole. Under these conditions, the pole piece 31 being a north pole, repels the armature 40, and the pole piece 33, being a south pole, attracts the armature 40; while the pole piece 32, being a north pole, attracts the armature 39, and the pole piece 34, being a south pole, repels the armature 39. A torque is therefore exerted on rotor R which rotates the rotor in a counter-clockwise direction as viewed in Fig. 2. This rotation of the rotor raises the counter-weight arm 74 to its upper position in which the projection 74ᵇ engages the stop screw 88, and brings the filter 17 into axial alignment with the roundel 7 at the focal point 13, so that the beam projected by the signal is then colored green. When the arm 74 is moved to its upper position, back contact 101ᵇ—109ᵇ becomes opened, and front contact 101ᵇ—110ᵇ becomes closed, as pointed out hereinbefore. The counter-clockwise rotation of the rotor, however, does not affect the counter-weight arm 73, so that back contact 101ᵃ—109ᵃ remains closed, and front contact 101ᵃ—110ᵃ remains open. The rotor will now remain in the position in which the filter 17 is located in axial alignment with the roundel 7 at the focal point 13 until pole changer P is operated to deenergize winding 57, at which time, the rotor will be returned to its normal position by the bias of the counter-weight arm 73 and the counter-weights 55 and 56.

If pole changer P is thrown in such a direction that coil 57 is supplied with current of reverse polarity, armature 40 becomes a south pole and armature 39 becomes a north pole. Under these conditions, armature 40 is attracted by pole piece 31 and repelled by pole piece 33; while armature 39 is repelled by pole piece 32 and attracted by pole piece 34, so that a torque is exerted on rotor R which rotates the rotor in a clockwise direction as viewed in Fig. 2. This rotation raises counter-weight arm 73 to its upper position, thereby opening back contact 101ᵃ—109ᵃ and closing front contact 101ᵃ—110ᵃ. This rotation also brings filter 19 into axial alignment with roundel 7 at the focal point 13 so that the beam projected by the signal is now yellow. During this rotation counter-weight arm 74 remains in the position shown, so that back contact 101ᵇ—109ᵇ remains closed and front contact 101ᵇ—110ᵇ remains open. When pole changer P is operated to deenergize coil 57, the armature will then return to its normal position due to the bias of the counter-weight arm 74 and the counter-weights 55 and 56.

It should be particularly pointed out that since coil 57 is slow-acting, the flux which is set up in the rotor R when this coil becomes energized builds up slowly, and the magnetic torque exerted on the rotor due to this flux therefore increases slowly, so that the rotor moves slowly from its normal position to either of its operated positions. This slow operation of the rotor minimizes the momentum acquired by the rotor and, hence, reduces the tendency of the rotor to rebound when the rotation of the rotor is stopped by the counter-weight arm which is raised by the rotor engaging the upper stop nut, thereby materially improving the operation of the signal. Furthermore, since the coil 57 is slow-acting, the decay of the flux in the rotor upon deenergization of the coil is also retarded, thereby causing the magnetic torque exerted on the rotor by this flux to decrease slowly, with the result that the rotor returns slowly to its normal position. By slowing up the motion of the rotor while returning to its normal position in this manner, the tendency of the armature to overtravel and rock in its normal position due to the momentum acquired by the rotating parts is almost entirely eliminated. It will likewise be apparent, that the use of the slow-acting coil also retards the decay and building up of the magnetic flux in the rotor when the polarity of the current supplied to the coil 57 is reversed, thus slowing up the motion of the rotor when going from one energized position to the other, and hence reducing the tendency of the rotor to rebound under these conditions.

It should be pointed out, further, that since the armatures 39 and 40 are formed with tapered ears as previously described, a greater torque is exerted on the rotor near the end of its stroke in either direction than at the beginning, this added torque being desirable for compressing the front contacts of the signal.

One advantage of a signal constructed in accordance with my invention is that since the air gaps between the armatures and their associated pole pieces are vertical and parallel no dirt will collect in these air gaps. Furthermore they are easily measured and may be inspected after the operating mechanism is completely assembled.

Another advantage of a signal constructed in accordance with my invention is that the parts comprising the operating mechanism are largely rectangular in shape which greatly facilitates the machining of these parts, and hence materially decreases the cost of manufacture of the signal.

A further advantage of a signal constructed in accordance with my invention is that since both the screws which fasten each pole piece to the associated backstrap pass through clearance holes in the pole piece, the air gap between a pole piece and the associated armature can be adjusted merely by loosening the screws and then moving the pole piece until the desired air gap is obtained. After this has been done, the screws may again be tightened, and the pole piece will then be held in the desired position. In this way, any one of the four air gaps can be adjusted without affecting the other three.

It will thus be seen that I have provided a signal having an operating mechanism which is biased to a central or normal position, but which may be caused to rotate to either of two extreme positions according to the polarity of the current supplied to its winding. It will also be seen that I have provided a signal mechanism which is economical to manufacture and which may be operated at a low cost since a portion of the flux required for its operation is obtained from permanent magnets instead of from electromagnets.

Although I have herein shown and described only one form of light signal embodying my invention, it is understood that various changes and modifications may be made therein within the scope of the appended claims without departing from the spirit and scope of my invention.

Having thus described my invention, what I claim is:

1. An electro-responsive device comprising a field structure consisting of permanently magnetized bars having their like poles connected by magnetizable backstraps, a first and a second pair of pole pieces attached to said backstraps in such manner that the two pole pieces of each pair are of opposite polarity, the pole pieces of each pair being formed with pole faces which are located in the same vertical plane, a rotor having two armatures connected by a magnetizable core and one separated from the pole pieces of each pair by vertical air gaps, and means for reversibly supplying flux to said rotor.

2. An electro-responsive device comprising a field structure consisting of two magnets having their like poles connected by spaced parallel horizontally extending backstraps, a first and a second pair of L shaped pole pieces, each said pole piece being formed with a vertically extending leg and with a horizontally extending leg, means for adjustably attaching the horizontally extending legs of said pole pieces to said backstraps in such manner that the vertically extending legs of the pole pieces of said first pair are located in the same vertical plane on one side of and adjacent one end of said backstraps and the vertically extending legs of the pole pieces of said second pair are located in the same vertical plane on the other side of and adjacent the other end of said backstraps, the ends of the vertically extending legs of each pair being separated by a horizontal air gap, a rotor comprising two oppositely extending armatures connected by a magnetizable core and one separated from the pole pieces of each pair by vertical air gaps, and a fixed coil surrounding the core of said rotor for reversibly supplying flux to said rotor according as said coil is energized by current of one polarity or the other.

3. An electro-responsive device comprising two magnets each consisting of a plurality of permanently magnetized bars clamped against two magnetizable plates located adjacent the upper and lower ends of the bars respectively, said bars being disposed in such manner that their corresponding ends are all of the same polarity, two backstraps one fastened to the corresponding plates of both magnets at each end of the magnets for connecting the like poles of the magnets together, two pairs of pole pieces attached to said backstraps in such manner that the pole pieces of each pair are of opposite polarity and the corresponding pole pieces of both pairs are of the same polarity, each said pair of pole pieces being provided with pole faces which are located in the same vertical plane, a rotor comprising two armatures connected by a magnetizable core and one separated from the pole pieces of each pair by vertical air gaps, and a fixed coil surrounding said core for reversibly supplying flux to said rotor.

4. An electro-responsive device comprising two magnets each consisting of two magnetizable plates clamped between two pairs of vertically extending permanently magnetized bars adjacent the upper and lower ends of the bars respectively, the bars of each pair being disposed in parallel spaced relation with one another and arranged in such manner that their corresponding ends are all of the same polarity, two non-magnetizable spacing blocks one located between the plates of each magnet and each provided in one side with a slot which is open at its outer end, two clamping bolts one associated with each magnet and extending through the slot in the spacing block for such magnet and between the bars of each pair of bars for such magnet, two nuts one screwed on each bolt, four clips one interposed between the head of each bolt and the associated pair of bars and one interposed between the nut on each bolt and the associated pair of bars, each clip being provided with ears at each end which overlap the opposite sides of the two bars of each pair for holding the bars in the proper spaced relation, two backstraps one fastened to the corresponding plates of both magnets at each end of the magnets for connecting the like poles of the magnets together, a first and a second pair of L shaped pole pieces, each said pole piece being formed with a vertically extending leg and with a horizontally extending leg, means for adjustably attaching the horizontally extending legs of said pole pieces to said backstraps in such manner that the vertically extending legs of the pole pieces of said first pair are located in the same vertical plane on one side of and adjacent one end of said backstraps and the vertically extending legs of the pole pieces of said second pair are located in the same vertical plane on the other side of and adjacent the other end of said backstraps, the ends of the legs of each pair being separated by a horizontal air gap, a rotor comprising two oppositely extending armatures connected by a magnetizable core and one separated from the pole pieces of each pair by vertical air gaps, means for biasing said rotor to a normal position in which the action of each pole piece on each armature is substantially equal, and a fixed coil surrounding the core of said rotor between said armatures, whereby when said coil is energized said rotor is swung through a small angle in one direction or the other from said normal position due to the attraction between one armature and one of the associated pole pieces and the repulsion of such armature from the other associated pole piece as well as the attraction between the second armature and one of its associated pole pieces and the repulsion of the second armature from its other associated pole piece, the direction in which the armature swings depending upon the direction of the flux created in said core by said coil.

5. An electro-responsive device comprising a field structure having two pairs of pole pieces, means for supplying flux to all of said pole pieces in such manner that the two pole pieces of each pair are of opposite polarity and the corresponding pole pieces of both pairs are of the same polarity, a rotor having two oppositely extending armatures connected by a magnetizable core and one separated from the pole pieces of each pair by air gaps, means for biasing said rotor to a normal position in which the action of each pole piece on each armature is substantially equal, a fixed coil surrounding the core of said rotor between said armatures for reversibly supplying flux to said rotor to cause said rotor to swing through a limited angle in one direction or the other from said normal position according as said coil is supplied with current of normal or reverse polarity, and means associated with said coil for delaying the rate at which the flux due to said coil builds up and decays in said core to slow up the rate at which said armature moves from its normal position when said coil becomes energized and returns to its normal position when said coil becomes deenergized, whereby the tendency of said rotor to rebound when rotated from its normal position in either direction and to rock when it returns to its normal position is substantially eliminated.

6. An electro-responsive device comprising a field structure having two pairs of pole pieces, means for supplying flux to all of said pole pieces in such manner that the two pole pieces of each pair are of opposite polarity and the corresponding pole pieces of both pairs are of the same polarity, a rotor having two oppositely extending armatures connected by a magnetizable core and one separated from the pole pieces of each pair by air gaps, means for biasing said rotor to a normal position in which the action of each pole piece on each armature is substantially equal, a fixed coil surrounding the core of said rotor between said armatures for reversibly supplying flux to said rotor to cause said rotor to swing through a limited angle in one direction or the other from said normal position according as said coil is supplied with current of normal or reverse polarity, said coil being provided with a heavy conducting tube for delaying the rate at which the flux builds up and decays in said core to slow up the rate at which said armature moves from its normal position when said coil becomes energized and returns to its normal position when said coil becomes deenergized, whereby the tendency of said rotor to rebound when rotated from its normal position in either direction and to rock when it returns to its normal position is substantially eliminated.

7. A field structure for an electro-responsive device comprising two magnetizable spaced parallel backstraps, two non-magnetizable spacing blocks located between said two backstraps adjacent the ends of the backstraps, four magnetizable plates one interposed between each end of each block and the adjacent backstrap, two permanently magnetized bars, means for clamping one bar against the sides of the two plates associated with each spacing block, and pole pieces attached to said backstraps.

8. A magnet comprising two magnetizable plates, a non-magnetizable spacing block located between said two plates, said spacing block being provided in one side with a slot which is open at its outer end, a bolt extending through said slot, and two pairs of permanently magnetized bars clamped against the opposite sides of said magnetizable plates by means of said bolt in such manner that said bars may be removed by loosening said bolt and sliding the bars and bolt outwardly at right angles to the axis of said spacing block.

9. A magnet comprising a non-magnetizable spacing block, two magnetizable plates fastened to opposite ends of said block, said block being provided in one side with a slot which is open at its outer end, two pairs of permanently magnetized bars engaging the opposite sides of said magnetizable plates, the bars being disposed in such manner that their corresponding ends are all of the same polarity, a bolt extending through said slot and between the bars of each pair, a nut on said bolt, and two clips one interposed between the head of said bolt and the bars of one pair and the other interposed between said nut and the bars of the other pair, said clips being provided at their ends with ears which overlap the opposite sides of the two bars of each pair for holding the bars in the proper spaced relation.

10. A field structure for an electro-responsive device comprising two magnets; each said magnet comprising a non-magnetizable spacing block, two magnetizable plates fastened to the opposite ends of said block, said block being provided in one side with a slot which is open at its outer end, two pairs of permanently magnetized bars engaging the opposite sides of said magnetizable plates, the bars being disposed in such manner that their corresponding ends are all of the same polarity, a bolt extending through said slot and between the bars of each pair, a nut on said bolt, and two clips one interposed between the head of said bolt and the bars of one pair and the other interposed between said nut and the bars of the other pair, said clips being provided at their ends with ears which overlap the opposite sides of the two bars of each pair for holding the bars in the proper spaced relation; two backstraps one fastened to the corresponding plates of both magnets at each end of the magnets for connecting the like poles of the magnets together, and pole pieces attached to said backstraps.

In testimony whereof I affix my signature.

WESLEY B. WELLS.